(12) United States Patent
Zhao et al.

(10) Patent No.: US 12,430,941 B2
(45) Date of Patent: Sep. 30, 2025

(54) METHOD FOR DETERMINING A PENGUIN POPULATION, DEVICE AND COMPUTER READABLE MEDIUM THEREFOR

(71) Applicants: HAINAN UNIVERSITY, Haikou (CN); SANYA RESEARCH INSTITUTE OF HAINAN UNIVERSITY, Sanya (CN)

(72) Inventors: Peng Zhao, Haikou (CN); Hao Liu, Haikou (CN); Yufei Deng, Haikou (CN); Pengjia Liu, Haikou (CN); Jinmeng Yan, Haikou (CN); Zhenhua Cui, Haikou (CN); Song Ge, Haikou (CN)

(73) Assignees: HAINAN UNIVERSITY, Haikou (CN); SANYA RESEARCH INSTITUTE OF HAINAN UNIVERSITY, Sanya (CN)

( * ) Notice: Subject to any disclaimer, the term of this patent is extended or adjusted under 35 U.S.C. 154(b) by 364 days.

(21) Appl. No.: 18/136,280

(22) Filed: Apr. 18, 2023

(65) Prior Publication Data
US 2023/0334891 A1    Oct. 19, 2023

(30) Foreign Application Priority Data
Apr. 19, 2022    (CN) .......................... 202210412662.4

(51) Int. Cl.
*G06V 40/10*    (2022.01)
*G06T 7/90*     (2017.01)
(Continued)

(52) U.S. Cl.
CPC ............... *G06V 40/10* (2022.01); *G06T 7/90* (2017.01); *G06V 10/25* (2022.01); *G06V 10/56* (2022.01);
(Continued)

(58) Field of Classification Search
None
See application file for complete search history.

(56) References Cited

U.S. PATENT DOCUMENTS

2013/0223715 A1    8/2013  Jerebko et al.
2020/0043171 A1*   2/2020  Laradji ................. G06V 10/82

FOREIGN PATENT DOCUMENTS

| CN | 110399806 A | 11/2019 |
| CN | 111696177 A | 9/2020 |
| CN | 112990517 A | 6/2021 |

OTHER PUBLICATIONS

Pfeifer et al., "Using Fixed-Wing UAV for Detecting and Mapping the Distribution and Abundance of Penguins on the South Shetlands Islands, Antarctica", DOI: https://doi.org/10.3390/drones3020039 (Year: 2019).*

(Continued)

*Primary Examiner* — Chan S Park
*Assistant Examiner* — Promotto Tajrian Islam

(57) ABSTRACT

The disclosure provides a method, a device and a computer readable medium for determining the penguin population relating to the technical field of image processing. The method of one embodiment of the disclosure comprises the following steps: firstly acquiring the penguin habitat image detected by the unmanned airborne sensor; and acquiring an interest region with penguins distributing, and a gray value of the interest region from the penguin habitat image; then for any one of gray value: determining a penguin state according to the gray value; finally determining the penguin population according to the penguin state.

18 Claims, 6 Drawing Sheets

(51) Int. Cl.
*G06V 10/25* (2022.01)
*G06V 10/56* (2022.01)
*G06V 20/17* (2022.01)

(52) U.S. Cl.
CPC .... *G06V 20/17* (2022.01); *G06T 2207/10032* (2013.01); *G06T 2207/30242* (2013.01)

(56) References Cited

OTHER PUBLICATIONS

Bird et al. "A Semi-Automated Method for Estimating Adelie Penguin Colony Abundance from a Fusion of Multispectral and Thermal Imagery Collected with Unoccupied Aircraft Systems", DOI: https://doi.org/10.3390/rs12223692 (Year: 2020).*
Belyaev et al., "Assessing topographic features and population abundance in an Antarctic penguin colony through UAV-based deep-learning models", DOI: https://doi.org/10.1016/j.jag.2024.104124 (Year: 2024).*
Hodgson et al., "Drones count wildlife more accurately and precisely than humans", DOI: https://doi.org/10.1111/2041-210X.12974. (Year: 2018).*
McNeill et al., "Semi-automated penguin counting from digital aerial photographs", DOI: 10.1109/IGARSS.2011.6050185 (Year: 2011).*
Peng Chuyue et al., A Recognizing Method of Penguin Population Using UAV Images Based on Object Otiented Classification, pp. 1-16 of the main text, date of issue Apr. 25, 2021, Retrieved from Internet, https://doi.org/10.13203/j.whugis20200557.

* cited by examiner

METHOD FOR DETERMINING A PENGUIN POPULATION, DEVICE AND COMPUTER READABLE MEDIUM THEREFOR

CROSS-REFERENCE TO RELATED APPLICATIONS

This application claims the benefit of the Chinese Patent Applications No. 202210412662.4, filed on Apr. 19, 2022, the disclosure of which is incorporated herein by reference in its entirety.

TECHNICAL FIELD

The present disclosure relates to the technical field of image processing, more particularly relates to a method for determining a penguin population, device and computer readable medium therefor.

BACKGROUND

The biological population usually refers to all individuals of the same creatures occupying a certain space for a certain duration. The population is the total number of individuals in a species. The population is the basis for calculating population density, birth rate, death rate, immigration rate, and emigration rate.

On the one hand, determining the population is conducive to revealing the variation of the Antarctic penguin population, thus providing basic data support for the population protection of Antarctic penguins. On the other hand, determining the population is also conducive to analyzing the natural and social factors in the Antarctic penguin population distribution, thus being beneficial for ecosystem protection and restoration, and then providing the necessary basis for promoting a sustainable economy and social development around the habitat.

In order to determine the Antarctic penguin population, the conventional method is mainly field detecting and counting manually. However, the conventional method is not only influenced by the observer experience, but also consumes a lot of manpower, material resources and time in the whole process. Therefore, the counting result exists large errors, with less economy and efficiency.

SUMMARY

In view of the above, the embodiment of the disclosure provides a method for determining a penguin population, device and computer readable medium therefor, accurately detecting the penguin population at the same time point.

In order to achieve the above purpose, according to the first aspect of the embodiment of the present disclosure, a method for determining a penguin population is provided including the following steps: acquiring a penguin habitat image detected by an unmanned airborne sensor; acquiring an interest region with penguins distributing, and a gray value of the interest region from the penguin habitat image; for any one of gray value: determining a penguin state according to the gray value; determining the penguin population according to the penguin state.

Optionally, the determining a penguin state according to the gray value includes: if the gray value meets a first preset condition, determining the gray value corresponding to an adult penguin, and acquiring a raster data corresponding to the gray value from the penguin habitat image; converting the raster data into a vector data, and determining a circumference property parameter of the adult penguin according to the vector data; determining the adult penguin being in a standing state if the circumference property parameter meets a third preset condition; determining the adult penguin being in a lying face down state if the circumference property parameter meets a fourth preset condition.

Optionally, the determining a penguin state according to the gray value includes: determining the gray value as a baby penguin if the gray value meets a second preset condition, and acquiring the raster data corresponding to the gray value from the penguin habitat image; converting the raster data into a vector data, and determining an area property parameter of the baby penguin according to the vector data; determining the baby penguin as an individual state if the area property parameter meets a fifth preset condition; identifying the larval penguin as a daycare state if the area property parameter meets a sixth preset condition.

Optionally, the penguin is divided into the adult penguin and the baby penguin; and the determining the penguin population according to the penguin state includes: determining an adult penguin population according to an adult penguin state; determining a baby penguin population according to a baby penguin state; determining a total penguin population according to the adult penguin population and the baby penguin population.

Optionally, the determining the baby penguin population according to the baby penguin state includes: counting baby penguin corresponding to the individual state, to acquire a first baby penguin population; counting baby penguin corresponding to the daycare state, to acquire a second baby penguin population; determining the baby penguin population according to the first baby penguin population and the second baby penguin population.

Optionally, determining the gray value corresponding to the adult penguin and/or the baby penguin based on an object-oriented classification method.

In order to achieve the above purpose, according to the second aspect of the embodiment of the disclosure, a device for determining a penguin population is provided including: a first acquisition module configured to acquire a penguin habitat image detected by an unmanned airborne sensor; a second acquisition module configured to acquire an interest region with penguin distributing, and a gray value of the interest region of from the penguin habitat image; a first determination module configured to determine a penguin state according to any one of gray value; a second determination module configured to determine the penguin population according to the penguin state.

Optionally, the first determination module includes a first determination unit configured to determine the gray value corresponding to an adult penguin if the gray value meets a first preset condition, and acquire a raster data corresponding to the gray value from the penguin habitat image; a second determination unit configured to convert the raster data into a vector data, and determine a circumference property parameter of the adult penguin according to the vector data; a third determination unit configured to determine the adult penguin being in a standing state if the circumference property parameter meets a third preset condition; a fourth determination unit configured to determine the adult penguin being in a lying face down state if the circumference property parameter meets a fourth preset condition.

Optionally, the first determination unit is also configured to determine the gray value corresponding to a baby penguin if the gray value meets a second preset condition, and acquire the raster data corresponding to the gray value from the penguin habitat image; the second determination unit also configured to convert the raster data into the vector data, and determine an area property parameter of the baby penguin according to the vector data; the third determination unit also configured to determine the baby penguin being in an individual state if the area property parameter meets a fifth preset condition; the fourth determination unit also configured to determine the baby penguin being in a daycare state if the area property parameter meets a sixth preset condition.

In order to achieve the above purpose, according to the third aspect of the embodiment of the present disclosure, a computer readable medium storing a computer program is provided. The computer program implements the method for determining the penguin population as described in the first aspect executed by a processor.

In the embodiment of the disclosure, firstly acquiring the penguin habitat image detected by the unmanned airborne sensor, acquiring the interest region with penguins distributing, and the gray value of the interest region from the penguin habitat image; then for any one of gray value: determining the penguin state according to the gray value; finally, determining the penguin population according to the penguin state. Detect the penguin habitat image by the unmanned airborne sensor, thus not only non-contact and non-interference detection is implemented, but also enlarges the detection range. Then determine the penguin population according to the penguin habitat image, thus the penguin population is determined automatically according to the detected penguin habitat image, so as to improve the accuracy and reliability of penguin population statistical results.

Further effects of the non-conventional alternatives described above will be described below in connection with specific embodiments.

BRIEF DESCRIPTION OF DRAWINGS

The drawings serve to better understand the disclosure and are not unduly limiting. In the drawings, identical or corresponding reference numerals denote identical or corresponding parts.

DETAILED DESCRIPTION OF EMBODIMENTS

Exemplary embodiments of the disclosure are described below compared with the drawings, including various details of the embodiments of the disclosure for understanding, which should be considered as exemplary only. Therefore, one skilled in the art will recognize that various changes and modifications are made to the embodiments described herein without departing from the scope and spirit of the present disclosure. Also, for the sake of clarity and conciseness, the description of well-known functions and structures is omitted in the following description.

Figure 1:
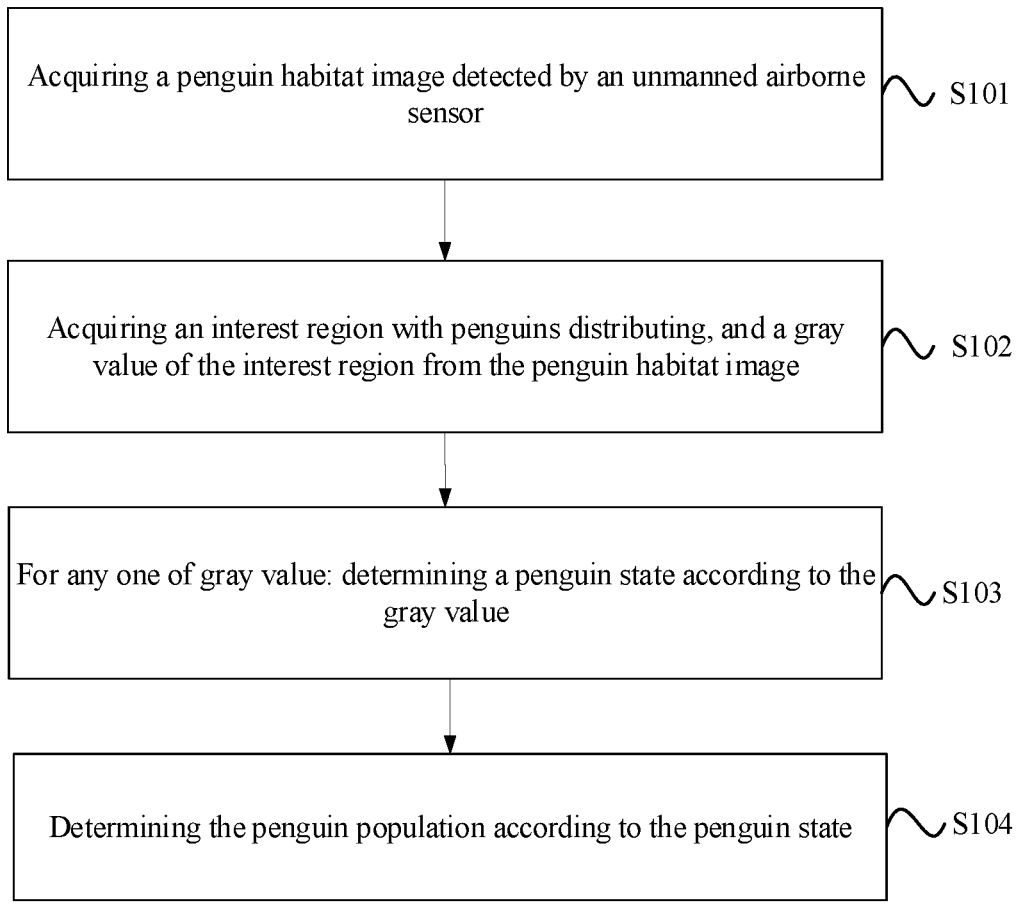
FIG. 1 is a flowchart of a method for determining the penguin population according to an embodiment of the present disclosure.

With reference to FIG. 1, a flowchart of a method for determining the penguin population according to an embodiment of the present disclosure includes at least the following operation steps:

S101, acquiring a penguin habitat image detected by an unmanned airborne sensor.

S102, acquiring an interest region with penguin distributing and a gray value of an interest region from the penguin habitat image.

S103, for any one of the gray value: a penguin state is determined according to the gray value.

S104, determining the penguin population according to the penguin state.

In S101, the current environmental characteristics and morphological parameters of penguin are acquired. The resolution corresponding to current environmental characteristics and morphological parameters is selected based on the preset rule or mapping relation. The penguin habitat image is detected by the unmanned airborne sensor based on the selected resolution.

In the embodiment, the penguin habitat image is processed by Fourier transform, and the processed penguin habitat image is acquired. Therefore, the penguin characteristics in the penguin habitat image are more prominent, and the post processing accuracy of the penguin habitat image is improved.

In S102, the place usually existing fresh feces in the penguin living environment is the penguin habitat or penguin activity area. Fresh feces usually appear red or earthy red in the penguin habitat image according to the different time fresh feces produced. Therefore, red areas or earthy red areas are selected from penguin habitat images as the interest region with penguins distributed according to the characteristics of penguin living environment. Because the adult penguin usually appears black in the gray image, while the baby penguin usually appears gray in the gray image, the gray value of the interest region is acquired.

In S103, the gray value is input into the pre-trained model to acquire the adult penguin state or baby penguin state. The penguin state is also determined according to the gray value based on the preset rule. For example, the gray value corresponding to the adult penguin or the baby penguin is determined based on the object-oriented classification rule.

Specifically, the gray value corresponding to the adult penguin is determined in a case where the gray value meets a first preset condition. The gray value corresponding to the baby penguin is determined in a case where the gray value meets a second preset condition. The gray value corresponding to the penguin living environment is determined in a case where the gray value meets a third preset condition. The grid data corresponding to the gray value of the adult penguin or baby penguin is acquired from the penguin habitat image, and the state property of penguin is determined according to the grid data.

In S104, the penguin is divided into the adult penguin and the baby penguin. The adult penguin population is determined according to the adult penguin state. The baby penguin population is determined according to the baby penguin state. The total penguin population is determined according to the adult penguin population and the baby penguin population.

Specifically, the adult penguin state includes a standing state and a lying face down state. The adult penguin population corresponding to the standing state is counted to acquire a first adult penguin population. The adult penguin population corresponding to lying face down state is counted to acquire a second adult penguin population. The total adult penguin population is determined according to the first adult penguin population and the second adult penguin population. The baby penguin state includes an individual state and a daycare state. The baby penguin population corresponding to the individual state is counted to acquire a first baby penguin population. The baby penguin population corresponding to the daycare state is counted to acquire a second baby penguin population. The baby penguin population is determined according to the first baby penguin population and the second baby penguin population. The total penguin population is determined according to the total adult penguin population and the total baby penguin population.

It should be noted that penguin is Antarctic penguin or other kinds of penguin.

In the embodiment of the disclosure, the penguin habitat image detected by the unmanned airborne sensor is firstly acquired. The interest region with penguin distributed, and the gray value of the interest region is acquired from the penguin habitat image. Then, for any one of the gray value: determining the penguin state according to the gray value. Finally, the penguin population is determined according to the penguin state. Detect the penguin habitat image by the unmanned airborne sensor, thus not only non-contact and non-interference detection is implemented, but also enlarges the detection range. Then determine the penguin population according to the penguin habitat image, thus the penguin population is determined automatically according to the detected penguin habitat image, so that the accuracy and reliability of the penguin population statistical result is improved.

Figure 2:
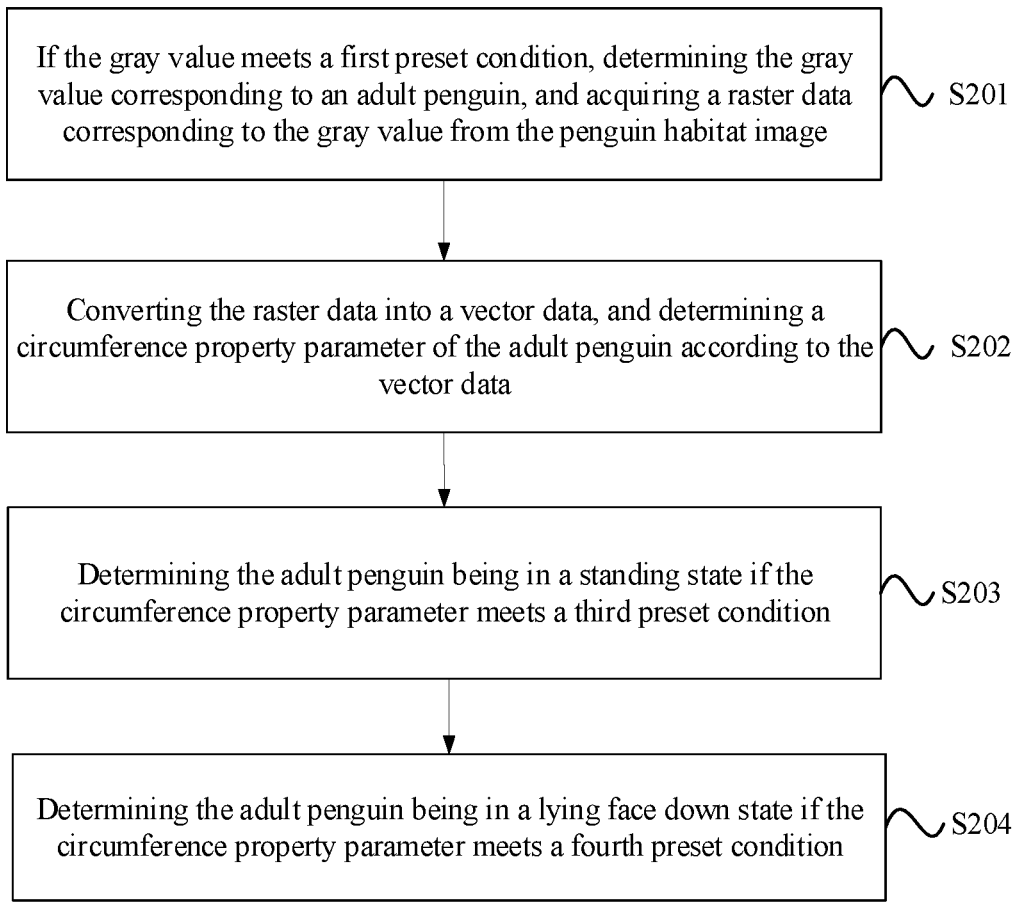
FIG. 2 is a flowchart of determining the adult penguin state based on the gray value according to another embodiment of the present disclosure.

With reference to FIG. 2, a flowchart of determining the adult penguin state based on the gray value according to another embodiment of the present disclosure. The embodiment is further optimized according to the above embodiment. The method for determining the adult penguin state includes at least the following operation steps:

S201, if the gray value meets a first preset condition, determining the gray value corresponding to an adult penguin, and acquiring a raster data corresponding to the gray value from the penguin habitat image.

S202, converting the raster data into a vector data, and determining a circumference property parameter of the adult penguin according to the vector data.

S203, determining the adult penguin being in a standing state if the circumference property parameter meets a third preset condition.

S204, determining the adult penguin being in a lying face down state if the circumference property parameter meets a fourth preset condition.

For example, the gray threshold of adult penguin is a, and the gray threshold of baby penguin is b. The minimum gray value in the penguin habitat image is min and the maximum gray value is max. The current gray value is f(x); if min≤f (x)≤a, the gray value f(x) corresponds to adult penguin. The corresponding raster data on f(x) is acquired from the penguin habitat image. The raster data is converted into vector data, and the circumference property parameter C of the adult penguin is determined according to the vector data. If the circumference property parameter C≥C0, the adult penguin is determined to be in the standing state. if the circumference property parameter C<C0, the adult penguin determined to be in the lying face down state.

In this embodiment, the penguin population is firstly determined according to the gray value, and then the penguin state is determined according to the circumference property parameter corresponding to the adult penguin raster data. Therefore, the penguin habitat image is processed through software based on the object-oriented classification method, so that the adult penguin state is determined accurately, and counting the adult penguin state automatically is implemented, thus the adult penguin population is accurately acquired, and the problem of penguin population statistical inaccuracy caused by manual counting is avoided.

Figure 3:
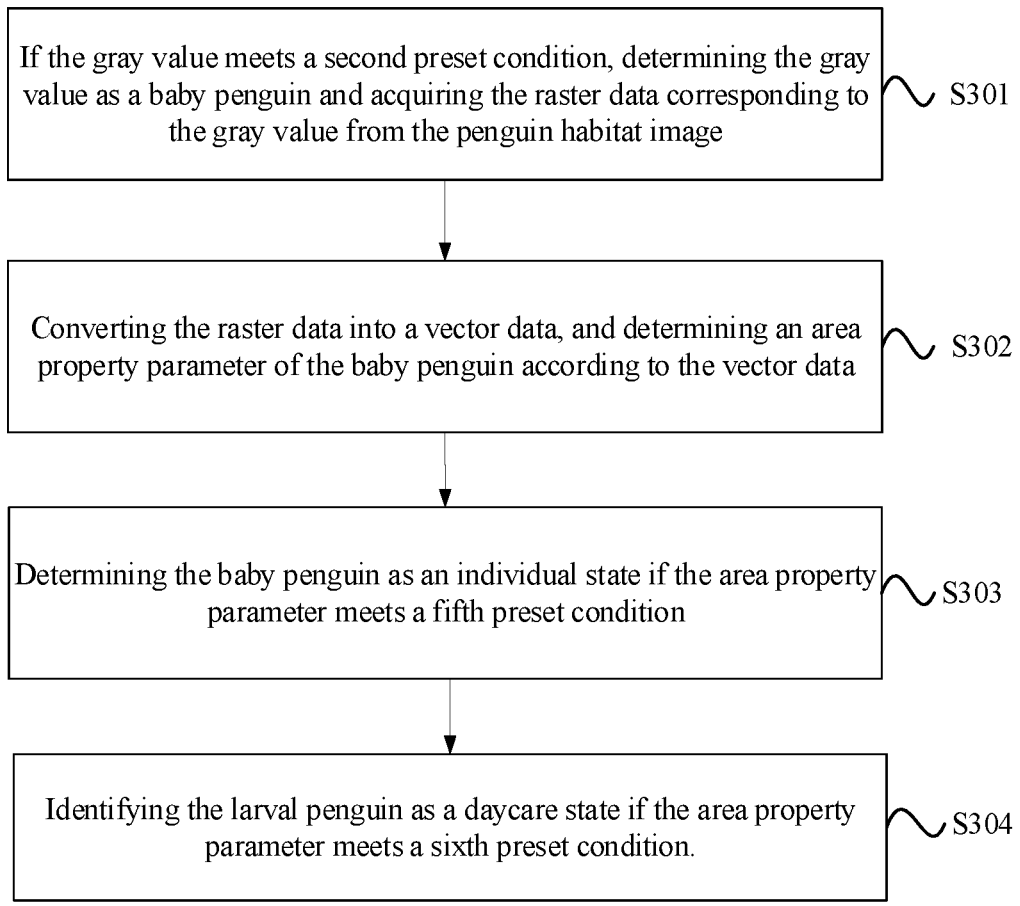
FIG. 3 is a flowchart of determining the baby penguin state based on the gray value according to another embodiment of the present disclosure.

With reference to FIG. 3, a flowchart of determining the baby penguin state based on the gray value according to another embodiment of the present disclosure. The embodiment is further optimized according to the above embodiment. The method for determining the baby penguin state includes at least the following operation steps:

S301, determining the gray value as a baby penguin if the gray value meets a second preset condition, and acquiring the raster data corresponding to the gray value from the penguin habitat image.

S302, converting the raster data into a vector data, and determining an area property parameter of the baby penguin according to the vector data.

S303, determining the baby penguin being an individual state if the area property parameter meets a fifth preset condition.

S304, determining the baby penguin being a daycare state if the area property parameter meets a sixth preset condition.

For example, the gray threshold of adult penguin is a, and the gray threshold of baby penguin is b. The minimum gray value in the penguin habitat image is min and the maximum gray value is max. The current gray value is f(x); If a<f(x)≤b, the gray value f(x) corresponds to the baby penguin. The corresponding raster data on f(x) is acquired from the penguin habitat image. The raster data is converted into vector data, and the area property parameter S of the baby penguin is determined according to the vector data. If 0<S≤S0, the raster data of gray value f(x) corresponds to one baby penguin. if S0<S≤2S0, it is two baby penguin. if S0<S≤NS0, it is N baby penguin, and so on. When 3 or more baby penguin gathered, a daycare state is formed.

In this embodiment, the penguin population is firstly determined according to the gray value, and then the baby penguin state is determined according to the area property parameter corresponding to the baby penguin raster data. Therefore, the penguin habitat image is processed through software based on the object-oriented classification method, so that the baby penguin state is distinguished accurately, and counting the baby penguin state automatically is implemented, thus providing the basis for counting the baby penguin population, and the problem of penguin population statistical inaccuracy caused by manual counting is avoided.

It should be understood that in various embodiments of the present disclosure, the sequence number of the above processes does not mean the order of execution, and the order of execution for each process should be determined by its function and inherent logic, and should not be divided in any way as to the implementation process of the embodiments of the present disclosure.

The method for determining the penguin population according to the embodiments of the present disclosure is described in detail below in combination with specific applications.

The penguin habitat image detected by the unmanned airborne sensor is acquired.

Firstly, the interest region with penguins distributing, and the brightness value at each band of the interest region is acquired from the penguin habitat image. Secondly, the band or band combination with the greatest difference is selected according to the difference in brightness values at each band between the adult penguin and baby penguin, and the penguin population is divided into the adult penguin and the baby penguin. According to the difference of morphological parameters between the standing and lying face down state of adult penguins such as body length, body width, circumference, and area, the adult penguin is divided into the standing state and the lying face down state. The total baby penguin area is divided by the average area of baby penguin orthophoto image, to calculate the total baby penguin population. Three or more gathered baby penguins are determined as the daycare state, and one or two separately distributed baby penguins are determined as the individual state. The adult penguin population in the standing state and lying face down state, the baby penguin population in the daycare state, and the baby penguin in the individual state are counted, respectively. Finally, the adult penguin population and the baby penguin population are added to acquire the penguin population.

The penguin habitat image detected by the unmanned airborne sensor in Antarctica is acquired. The penguin habitat image is preprocessed by Fourier transform in ENVI remote sensing software. The penguin gray threshold from the penguin habitat image after pretreatment is a=−70 for adult penguins and b=−38 for baby penguins.

The interest region with the Adelie penguin distributed from the penguin habitat image is determined. Adult penguin M and baby penguin m are extracted from the penguin habitat image based on the object-oriented classification rule and preset gray threshold in ENVI. Wherein f(x) is any one of the gray value from the penguin habitat image, min is the minimum gray value from the penguin habitat image, and max is the maximum gray value.

If min≤f(x)≤−70, f(x) is the gray value corresponding to the adult penguin.

If −70<f(x)≤−38, f(x) is the gray value corresponding to the baby penguin.

If −38<f(x)≤max, f(x) is the gray value corresponding to the environment.

The raster data of f(x) corresponding to the adult penguin and the raster data of f(x) corresponding to the baby penguin are acquired from the penguin habitat image. The raster data of the adult penguin is converted into the vector data, and the circumference property parameter C of the adult penguin is determined according to the vector data. The raster data of the baby penguin is converted into the vector data, and the area property parameter S of the baby penguin is determined according to the vector data. The standing state and lying face down state of the adult penguin are distinguished according to the circumference property parameter, and the circumference segmentation threshold is set as C0=1 m according to the measured penguin state data. If 1m≤C, the adult penguin is in a standing state M1. Otherwise, the adult penguin is in a lying face down state M2.

The individual state m1 and daycare state m2 of baby penguins (3 or more baby penguins gathered) are distinguished according to the area property parameter, and the area segmentation threshold S0=0.053 m2 is set according to the measured penguin state data. If 0<S≤0.053 m2, there is one baby penguin. If 0.053 m2<S≤0.106 m2, there is two baby penguin gathered, and so on. The adult penguin population is determined according to the adult penguin state. The baby penguin population is determined according to the baby penguin state. The total penguin population is determined according to the adult penguin population and the baby penguin population; The result is shown in Table 1.

TABLE 1

| Penguin population statistical result | | | | | |
|---|---|---|---|---|---|
| Penguin Type | Adult penguin population | | Baby penguin population | | Total |
| Penguin state | Standing state | Lying face down state | Individual state | Daycare state | penguin population |
| Amount | 22419 | 7064 | 22529 | 5051 | 57063 |

Figure 4:
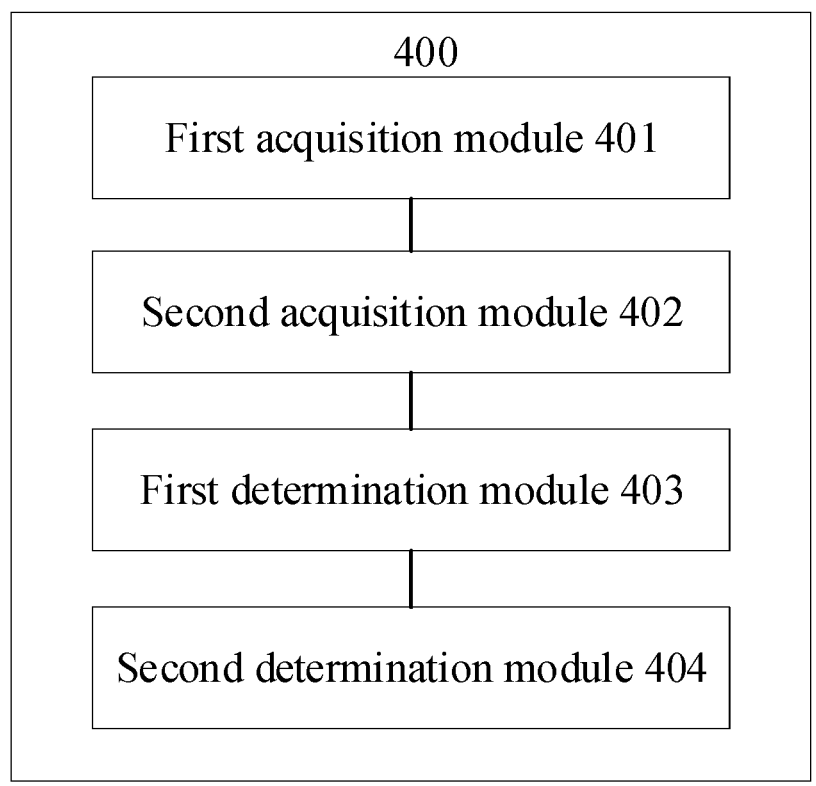
FIG. 4 is a structural schematic diagram of a device for determining the penguin population according to an embodiment of the present disclosure.

With reference to FIG. 4, a structural schematic diagram of a device for determining the penguin population according to an embodiment of the present disclosure. The Device 400 includes: a first acquisition module 401 configured to acquire the penguin habitat image detected by the unmanned airborne sensor; a second acquisition module 402 configured to acquire the interest region with penguins distributing, and the gray value of the interest region of from the penguin habitat image; a first determination module 403 configured to determine the penguin state according to any one of gray value; a second determination module 404 configured to determine penguin population according to the penguin state.

In an optional embodiment, the first determination module 401 includes: a first determination unit configured to determine the gray value corresponding to an adult penguin if the gray value meets a first preset condition, and acquire a raster data corresponding to the gray value from the penguin habitat image; a second determination unit configured to convert the raster data into a vector data, and determine a circumference property parameter of the adult penguin according to the vector data; a third determination unit configured to determine the adult penguin being in a standing state if the circumference property parameter meets a third preset condition; a fourth determination unit configured to determine the adult penguin being in a lying face down state if the circumference property parameter meets a fourth preset condition.

In an optional embodiment, the first determination module 401 includes: the first determination unit also configured to determine the gray value corresponding to a baby penguin if the gray value meets a second preset condition, and acquire the raster data corresponding to the gray value from the penguin habitat image; the second determination unit also configured to convert the raster data into the vector data, and determine an area property parameter of the baby penguin according to the vector data; the third determination unit also configured to determine the baby penguin being in an individual state if the area property parameter meets a fifth preset condition; the fourth determination unit also configured to determine the baby penguin being in a daycare state if the area property parameter meets a sixth preset condition.

In an optional embodiment, the penguins are divided into the adult penguin and the baby penguin. the second determination module 404 includes: the first determination unit configured to determine the adult penguin population according to the adult penguin state; the second determining unit configured to determine the baby penguin population according to the baby penguin state; the third determination unit configured to determine the total penguin population according to the adult penguin population and the baby penguin population.

In an optional embodiment, the second determination unit includes: a first statistical subunit configured to count baby penguins corresponding to the individual state, to acquire a first baby penguin population; a second statistical subunit is configured to count baby penguins corresponding to the daycare state, to acquire a second baby penguin population; a determination subunit configured to determine the baby penguin population according to the first baby penguin population and the second baby penguin population.

In an optional embodiment, the gray value corresponding to the adult penguin and/or the baby penguin is determined based on the object-oriented classification method.

The device executes the method for determining the penguin population provided by the embodiment of the present disclosure, and has corresponding functional modules and beneficial effects for executing the method for determining the penguin population. For technical details not described in detail in this embodiment, please refer to the method for determining the penguin population provided by the embodiment of the present disclosure.

Figure 5:
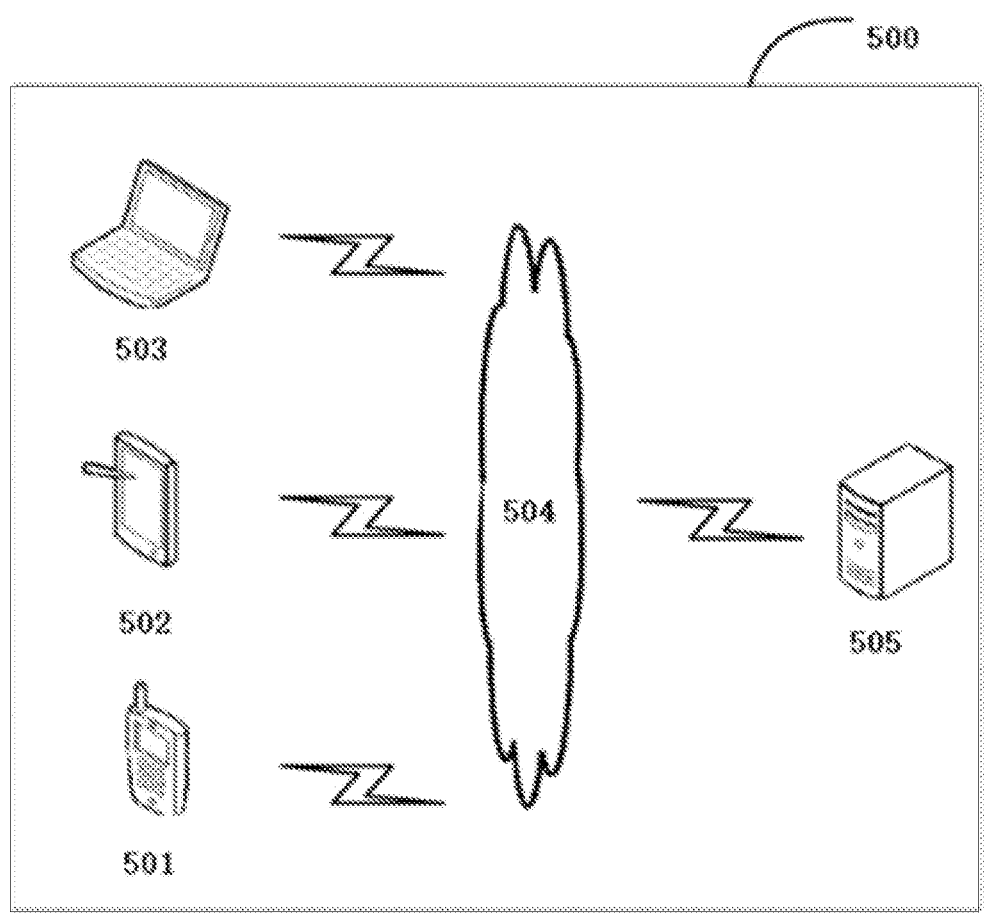
FIG. 5 is an exemplary system architecture diagram of which embodiments of the present disclosure are applied.

With reference to FIG. 5, an exemplary system architecture diagram of which embodiments of the present disclosure are applied. The system architecture 500 includes terminal devices 501, 502, 503, network 504, and server 505. The network 504 serves as a medium for providing a communication link between the terminal devices 501, 502, 503 and the server 505. Network 504 includes a variety of connection types such as wired, wireless communication links, or fiber optic cables, etc.

A user interacts with the server 505 over the network 504 using the terminal devices 501, 502, 503 to receive or send messages, etc. Various communication client applications, such as shopping applications, web browser applications, search applications, instant messaging tools, mailbox clients, social platform software, etc. (for example only) are installed on the terminal devices 501, 502, 503.

The terminal devices 501, 502, 503 are various electronic devices with a display screen and supporting web browsing, including, but not limited to, smart phones, tablet computers, laptop portable computers, desktop computers, and so on.

The server 505 is a server that provides various services, such as a background management server that supports click events generated by users using terminal devices 501, 502, 503 (for example only). The background management server analysis and process the received click data, text content and other data, and feed back the processing results (such as target push information and product information—for example only) to the terminal equipment.

It should be noted that the method for determining the penguin population provided by the embodiment of the present disclosure is generally executed by the server 505, accordingly, the device for determining the penguin population is generally arranged in the server 505.

It should be understood that the number of terminal devices, networks, and servers in FIG. 5 is only illustrative. According to the implementation requirements, there is any number of terminal devices, networks and servers.

Figure 6:
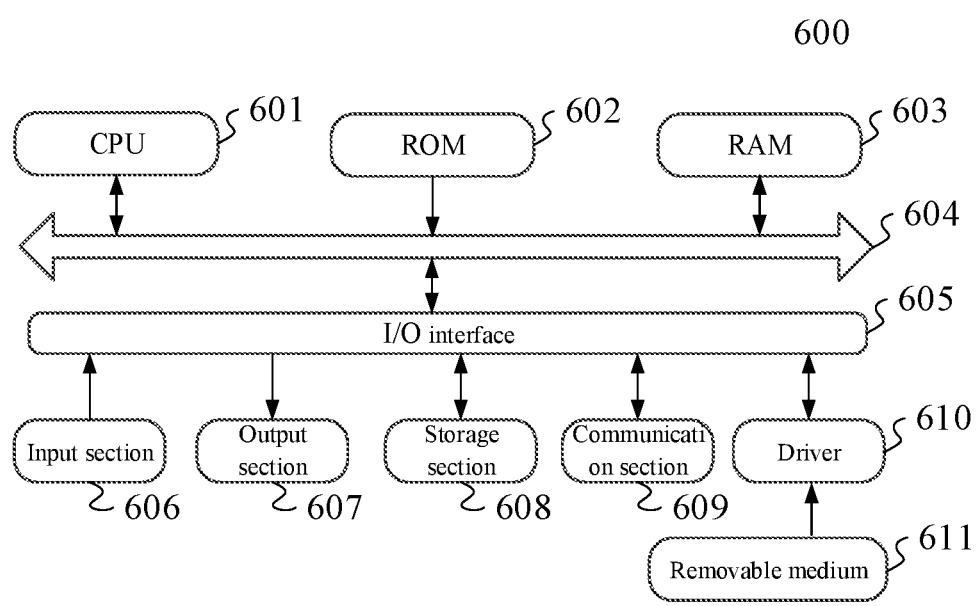
FIG. 6 is a schematic structural diagram of a computer system of a terminal device or server suitable for implementing the embodiment of the present disclosure.

With reference to FIG. 6, showing a schematic structural diagram of a computer system of terminal device or server suitable for implementing the embodiment. The terminal device shown in FIG. 6 is merely an example and should not impose any limitation on the functionality and scope of use of the embodiment of the present disclosure.

With reference to FIG. 6, the Computer System 600 includes a Central Processing Unit (CPU) 601 performing various appropriate actions and processes according to a program stored in a Read Only Memory (ROM) 602 or a program loaded into a Random Access Memory (RAM) 603 from a storage section 608. In RAM 603, various programs and data required for the operation of System 600 are also stored. The CPU 601, the ROM 602, and the RAM 603 are connected to each other through a bus 604. An input/output (I/O) interface 605 is also connected to the bus 604. The following components are connected to the I/O interface 605: including an input section 606, such as a keyboard, mouse, etc.; an output section 607, such as a cathode ray tube (CRT), liquid crystal display (LCD) and speaker, etc.; a storage section 608, such as a hard disk, etc.; and a communication section 609, such as a network interface card: LAN card, modem, etc. The communication section 609 performs communication processing via a network such as the Internet. The driver 610 is also connected to the I/O interface 605 as needed. The removable medium 611, such as a magnetic disk, optical disk, magneto-optical disk, a semiconductor memory, etc. is installed in the driver 610 as needed so that a computer program read therefrom is installed in the storage portion 608 as needed.

In particular, the process described in the above reference flowchart is implemented as a computer software program according to the disclosed embodiments of the present disclosure. For example, the embodiment of the present disclosure includes a computer program product, including a computer program carried on a computer readable medium. The computer program includes program code for executing the method shown in the flowchart. In such an embodiment, the computer program is downloaded and installed from the network through the communication section 609 and/or installed from the removable medium 611. When the computer program is executed by a central processing unit (CPU) 601, the above functions divided in the system of the present disclosure are performed.

It should be noted that the computer readable medium shown in the present disclosure is a computer readable signal medium, a computer readable storage medium, or any combination of the two. The computer readable storage medium is, such as, but is not limited to, electrical, magnetic, optical, electromagnetic, infrared, or semiconductor system, system/device, or any combination of the two. More specific examples of computer readable storage media include, but are not limited to: an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical memory device, a magnetic memory device, or any suitable combination formed above. In the present disclosure, the computer readable storage medium is any tangible medium containing or storing sequences. The program is configured by instruction execution system, system/device, or in conjunction with the above. In the present disclosure, the computer readable signal medium includes data signals propagated in the baseband or as part of a carrier wave in which computer readable program code is carried. Such propagated data signals may be configured in a variety of forms, including but not limited to electromagnetic signals, optical signals, or any suitable combination formed above. The computer readable signal medium may also be any computer readable medium except for a computer readable storage medium that may transmit, propagate, or transmit a program for instruction execution system, system/device, or in conjunction with the above. The program code included in the computer readable medium may be transmitted using any suitable medium, including but not limited to wireless, wire, fiber, optic cable, RF, etc., or any suitable combination formed above.

The flowchart and block diagram in the appended drawings illustrate possible implementations of the architecture, functions, and operations of systems, methods, and computer program products according to various embodiments of the present disclosure. In this view, each block in a flowchart or block diagram represents a module, program segment, or part of code including one or more executable instructions for performing a specified logical function. It should also be noted that in some alternative implementations, the functions indicated in the blocks are also executed in a different sequence from those indicated in the drawings. For example, two connected blocks are executed in parallel actually or sometimes executed in reverse order depending on the functionality involved. It is also noted that each block and a combination of blocks in the block diagram or flowchart are implemented with a dedicated hardware-based system performing a specified function or operation, or implemented with a combination of dedicated hardware and computer instructions.

The modules described in the embodiments of the present disclosure are implemented in a software manner or in a hardware manner. The described modules are also disposed in a processor, for example, described as: a processor including a sending module, an acquisition module, a determination module, and a first processing module. Wherein, the names of modules do not qualify the unit itself in some cases. For example, a sending module is also described as "a module sending a picture acquisition request to the connected server".

As another aspect, the present disclosure also provides a computer readable medium, either included in the devices described in the above embodiments; or exists alone and not be assembled into the device. The computer readable medium carries one or more programs. When one or more programs are executed by one of the devices, the device includes a flowchart of the method for determining the penguin population according to an embodiment of the disclosure. The method at least includes the following operation flowchart: S101, acquiring the penguin habitat image detected by the unmanned airborne sensor. S102, acquiring the interest region with penguins distributing, and the gray value of the interest region from the penguin habitat image. S103, for any one of the gray value: determining the penguin state according to the gray value. S104, determining the penguin population according to the penguin state.

The method for detecting the penguin population by the unmanned airborne sensor in the embodiment of the present disclosure is to acquire the population at the same time point, avoiding the error caused by the conventional manual counting method, and improving the statistical accuracy and reliability. The disclosure adopts remote sensing images to detect the penguin population, so that the interference of animal behavior and damage of habitat caused by close detection of the Antarctic penguins is avoided, and the safety and economy of field detection are greatly improved. There is a high application value. Thus the problem of detecting and counting the Antarctic penguin population with large population and dense distribution is solved.

In the description of this specification, descriptions of the reference terms "one embodiment," "some embodiments," "example," "specific example," or "some examples," etc. mean that specific features, structures, materials, or features described in combination with the embodiment or example are included in at least one embodiment or example of the disclosure. Further the specific features, structures, materials, or features described can be combined in a suitable manner in any one or more embodiments or examples. Further without contradicting one another those skilled in the art may combine and combine different embodiments or examples described in this specification and features of different embodiments or examples.

Furthermore, the terms "first" and "second" are configured for descriptive purposes only and are not understood as indicating or implying relative importance or implying the number of technical features indicated. Thus, the features divided as "first" and "second" explicitly or implicitly include at least one of the features. In the description of the present disclosure, "multiple" means two or more, unless expressly specified otherwise.

The above is only a specific embodiment of the present disclosure, but the scope of protection of the present disclosure is not limited thereto. Any person familiar with the technical field easily think of changes or substitutions within the technical scope disclosed by the present disclosure should be covered within the scope of protection of the present disclosure. Therefore, the protection scope of the disclosure shall be subject to the protection scope of the claims.

What is claimed is:

1. A method for determining a penguin population, comprising:
    acquiring a penguin habitat image detected by an unmanned airborne sensor;
    acquiring an interest region with penguin distributing, and a plurality of gray values of the interest region from the penguin habitat image;
    for any one of the gray values: determining a penguin state according to the gray value;
    determining the penguin population, according to the penguin state, wherein the penguin population is configured for revealing a variation of the Antarctic penguin population and analyzing natural and social factors in the Antarctic penguin population distribution, determining a penguin state according to the gray value comprises:
        if the gray value meets a first preset condition, determining the gray value corresponding to an adult penguin, and acquiring a raster data corresponding to the gray value from the penguin habitat image;
        converting the raster data into a vector data, and determining a circumference property parameter of the adult penguin according to the vector data;
        determining the adult penguin being in a standing state if the circumference property parameter meets a third preset condition;
        determining the adult penguin being in a lying face down state if the circumference property parameter meets a fourth preset condition.

2. The method as recited in claim 1, wherein
    the determining a penguin state according to the gray value includes:
    determining the gray value as a baby penguin if the gray value meets a second preset condition, and acquiring the raster data corresponding to the gray value from the penguin habitat image;
    converting the raster data into a vector data, and determining an area property parameter of the baby penguin according to the vector data;
    determining the baby penguin as an individual state if the area property parameter meets a fifth preset condition;
    identifying the baby penguin as a daycare state if the area property parameter meets a sixth preset condition.

3. The method as recited in claim 2, wherein
determining the gray value corresponding to at least one of the combinations of the adult penguin and the baby penguin, based on an object-oriented classification method.

4. The method as recited in claim 2, wherein
the penguin is divided into the adult penguin and the baby penguin; and
the determining the penguin population according to the penguin state includes:
determining an adult penguin population according to an adult penguin state;
determining a baby penguin population according to a baby penguin state;
determining a total penguin population according to the adult penguin population and the baby penguin population.

5. The method as recited in claim 4, wherein
the determining the baby penguin population according to the baby penguin state includes:
counting baby penguin corresponding to the individual state, to acquire a first baby penguin population;
counting baby penguin corresponding to the daycare state, to acquire a second baby penguin population;
determining the baby penguin population according to the first baby penguin population and the second baby penguin population.

6. The method as recited in claim 4, wherein
determining the gray value corresponding to at least one of the combinations of the adult penguin and the baby penguin based on an object-oriented classification method.

7. The method as recited in claim 1, wherein
the penguin is divided into the adult penguin and the baby penguin; and
the determining the penguin population according to the penguin state includes:
determining an adult penguin population according to an adult penguin state;
determining a baby penguin population according to a baby penguin state;
determining a total penguin population according to the adult penguin population and the baby penguin population.

8. The method as recited in claim 7, wherein
the determining the baby penguin population according to the baby penguin state includes:
counting baby penguin corresponding to the individual state, to acquire a first baby penguin population;
counting baby penguin corresponding to the daycare state, to acquire a second baby penguin population;
determining the baby penguin population according to the first baby penguin population and the second baby penguin population.

9. The method as recited in claim 8, wherein
determining the gray value corresponding to at least one of the combinations of the adult penguin and the baby penguin based on an object-oriented classification method.

10. The method as recited in claim 7, wherein
determining the gray value corresponding to at least one of the combinations of the adult penguin and the baby penguin based on an object-oriented classification method.

11. A computer readable medium storing a computer program, wherein the computer program implements the method according to claim 1 executed by a processor.

12. The method as recited in claim 1, wherein
the determining a penguin state according to the gray value includes:
determining the gray value as a baby penguin if the gray value meets a second preset condition, and acquiring the raster data corresponding to the gray value from the penguin habitat image;
converting the raster data into a vector data, and determining an area property parameter of the baby penguin according to the vector data;
determining the baby penguin as an individual state if the area property parameter meets a fifth preset condition;
identifying the baby penguin as a daycare state if the area property parameter meets a sixth preset condition.

13. The method as recited in claim 12, wherein
determining the gray value corresponding to at least one of the combinations of the adult penguin and the baby penguin based on an object-oriented classification method.

14. The method as recited in claim 1, wherein
the penguin is divided into the adult penguin and the baby penguin; and
the determining the penguin population according to the penguin state includes:
determining an adult penguin population according to an adult penguin state;
determining a baby penguin population according to a baby penguin state;
determining a total penguin population according to the adult penguin population and the baby penguin population.

15. The method as recited in claim 14, wherein
the determining the baby penguin population according to the baby penguin state includes:
counting baby penguin corresponding to the individual state, to acquire a first baby penguin population;
counting baby penguin corresponding to the daycare state, to acquire a second baby penguin population;
determining the baby penguin population according to the first baby penguin population and the second baby penguin population.

16. The method as recited in claim 14, wherein
determining the gray value corresponding to at least one of the combinations of the adult penguin and the baby penguin based on an object-oriented classification method.

17. A device for determining a penguin population, comprising:
a first acquisition module configured to acquire a penguin habitat image detected by an unmanned airborne sensor;
a second acquisition module configured to acquire an interest region with penguin distributing, and a plurality of gray values of the interest region of from the penguin habitat image;
a first determination module configured to determine a penguin state according to any one of gray value;
a second determination module configured to determine the penguin population according to the penguin state; wherein the penguin population is configured for revealing a variation of the Antarctic penguin population and analyzing natural and social factors in the Antarctic penguin population distribution, the first determination module includes:
a first determination unit configured to determine the gray value corresponding to an adult penguin if the gray value meets a first preset condition, and acquire a raster data corresponding to the gray value from the penguin habitat image;

a second determination unit configured to convert the raster data into a vector data, and determine a circumference property parameter of the adult penguin according to the vector data;

a third determination unit configured to determine the adult penguin being in a standing state if the circumference property parameter meets a third preset condition;

a fourth determination unit configured to determine the adult penguin being in a lying face down state if the circumference property parameter meets a fourth preset condition.

18. The device, as recited in claim 17, wherein the first determination module includes:

the first determination unit also configured to determine the gray value corresponding to a baby penguin if the gray value meets a second preset condition, and acquire the raster data corresponding to the gray value from the penguin habitat image;

the second determination unit also configured to convert the raster data into the vector data, and determine an area property parameter of the baby penguin according to the vector data;

the third determination unit also configured to determine the baby penguin being in an individual state if the area property parameter meets a fifth preset condition;

the fourth determination unit also configured to determine the baby penguin being in a daycare state if the area property parameter meets a sixth preset condition.

* * * * *